United States Patent [19]

Cutolo et al.

[11] Patent Number: 5,007,717

[45] Date of Patent: Apr. 16, 1991

[54] REAL TIME ANALYZER FOR PULSED LASER SYSTEMS

[76] Inventors: Antonello Cutolo, Via Albino 30, 80127 Napoli; Salvatore Solimeno, Mostra d'Oltremare, 80125 Napoli, both of Italy; John M. J. Madey, 2120 Amherst St., Palo Alto, Calif. 94306

[21] Appl. No.: 192,577

[22] Filed: May 11, 1988

[51] Int. Cl.$^5$ .......................... G02F 1/01; G01J 1/42; G01J 1/40; H01J 40/14

[52] U.S. Cl. ................................ 350/353; 250/208.2; 250/216; 250/552; 350/354; 356/222; 356/225; 356/233; 356/234; 356/256

[58] Field of Search ................ 350/353, 354; 356/265, 356/222, 225, 233, 234; 250/552, 208, 216, 208.2

[56] References Cited

U.S. PATENT DOCUMENTS

| | | | |
|---|---|---|---|
| 3,641,343 | 2/1972 | Langer | 250/552 X |
| 4,037,959 | 7/1977 | Bumgardner | 356/222 X |
| 4,339,199 | 7/1982 | Jones et al. | 350/354 X |
| 4,681,436 | 7/1987 | Ching et al. | 356/222 X |

OTHER PUBLICATIONS

Cutolo et al., "Real Time Processing of Picosecond and Femtosecond Laser Pulses: Application to Free-Electron Lasers", *Applied Physics Letters*, May 9, 1988, pp. 1566–1568.

*Primary Examiner*—Eugene R. LaRoche
*Assistant Examiner*—Michael B. Shingleton
*Attorney, Agent, or Firm*—Townsend and Townsend

[57] ABSTRACT

A technique for the simultaneous measurement, in real time, of the changes in mode size, pulse length, and power of a wavetrain of laser pulses delivered by mode-locked or other pulsed laser systems contemplates directing respective portions of the beam along each of three beam paths. The beam portions along the first and second beam paths are subjected to respective, and different, degrees of focusing, and then passed through respective non-linear elements which generate radiation at the second harmonic. The first harmonic components are removed, and the second harmonic components are passed to respective first and second detectors which generate signals representative of the total second harmonic energy along each of the first and second beam paths. The beam portion along the third beam path is passed to a detector which generates a signal representative of the total energy in the beam pulse. The three signals are combined to give values proportional to peak power, pulse length, and mode size.

38 Claims, 3 Drawing Sheets

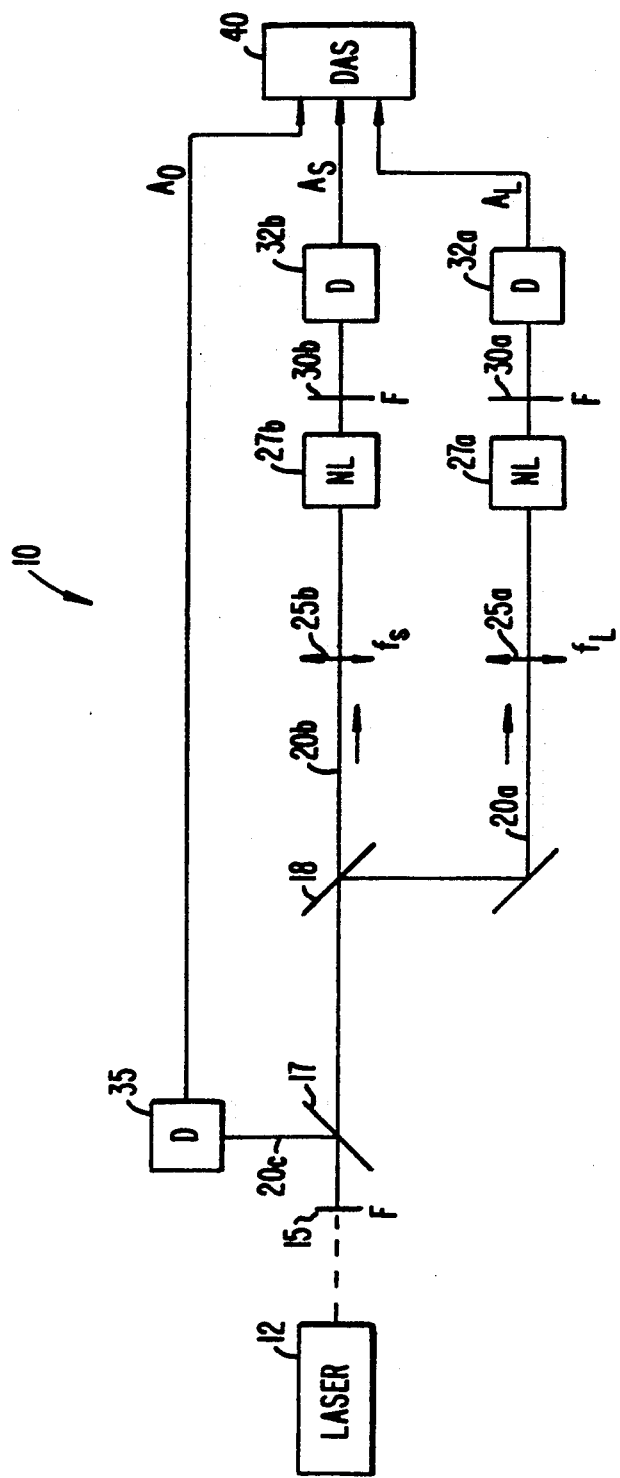
FIG._1.

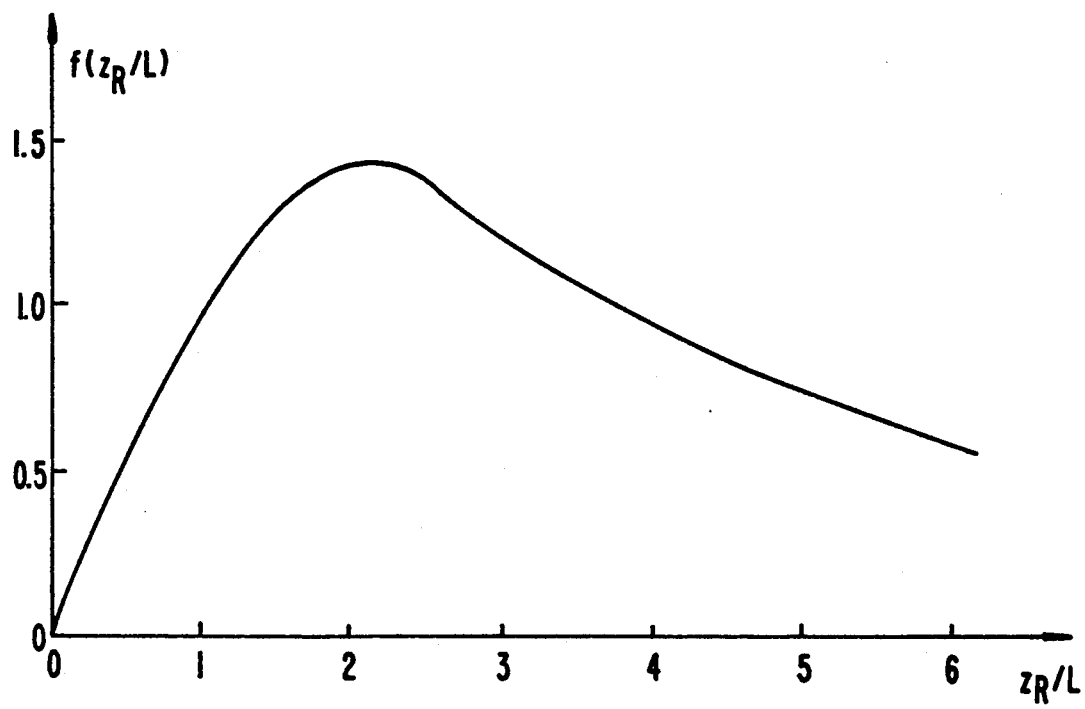
FIG._2.

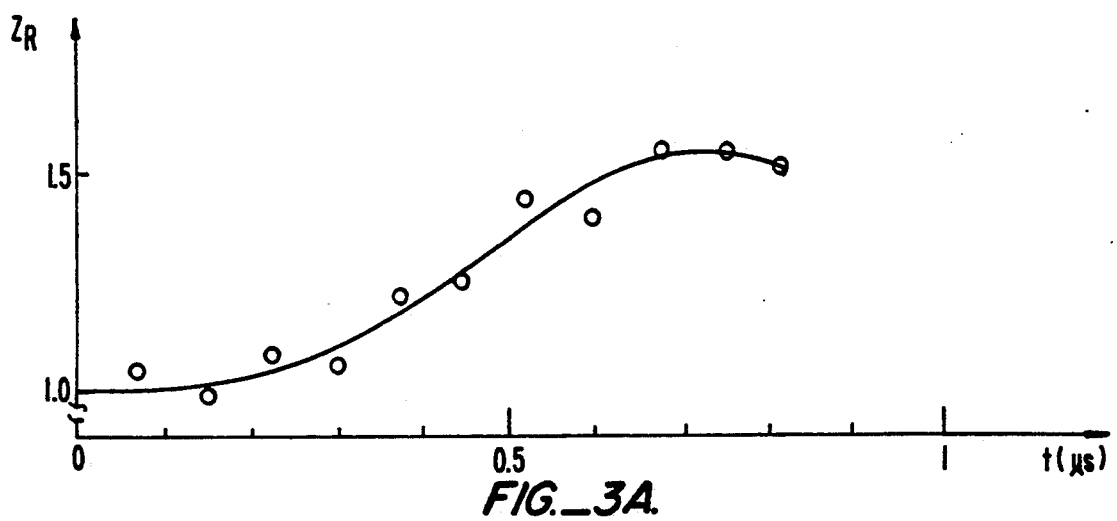
FIG._3A.
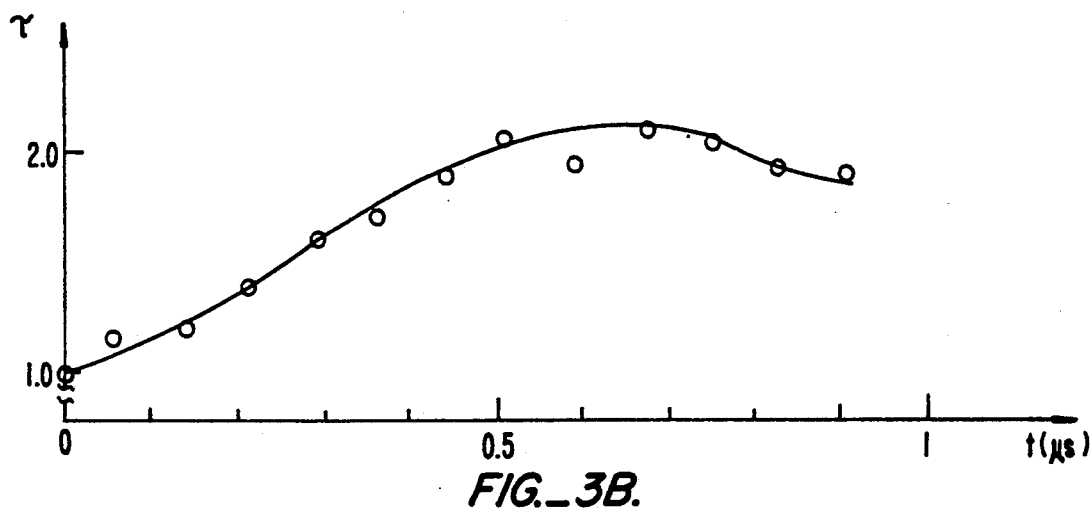
FIG._3B.
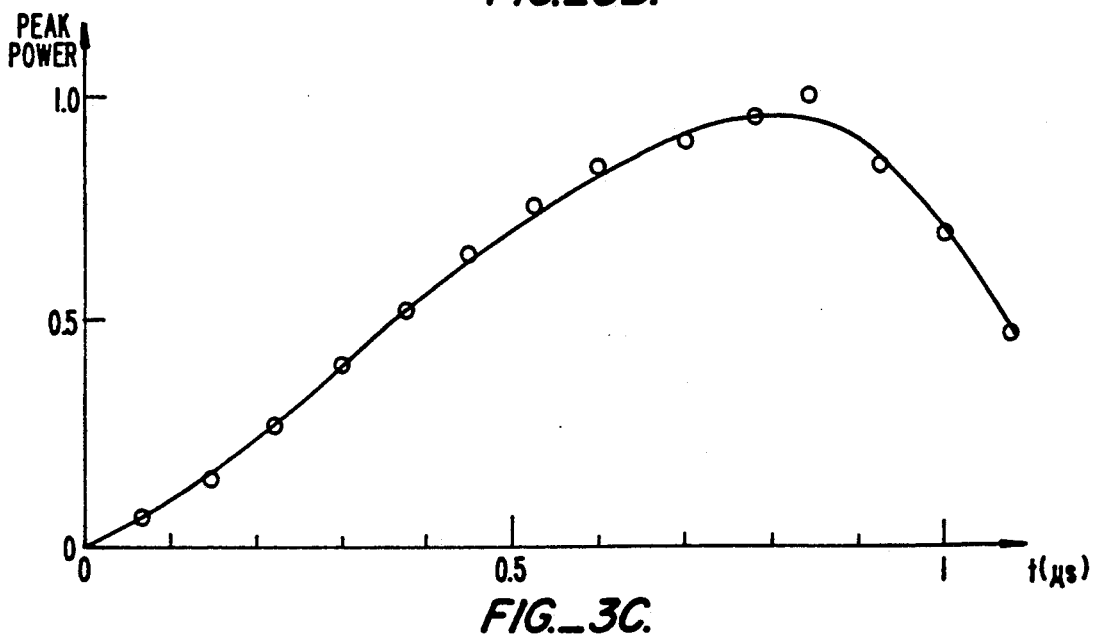
FIG._3C.

REAL TIME ANALYZER FOR PULSED LASER SYSTEMS

FIELD OF THE INVENTION

The invention relates generally to the characterization of laser beams, and more specifically to a technique for the measurement of the time dependence of the parameters of a laser beam.

BACKGROUND OF THE INVENTION

Picosecond light pulses are employed in a number of applications to measure the temporal response of electronic and optical materials and devices. Such pulses are conventionally produced by phase-locking the longitudinal modes of a free-running laser oscillator. Such mode-locked lasers produce a train of short pulses with a width inversely proportional to the homogeneously broadened gain linewidth of the lasing medium and a pulse-to-pulse separation equal to the round-trip time of light through the laser or to an integral sub-multiple of this time. Such mode-locked lasers are capable of producing pulses with widths as short as 0.1–10 picoseconds at pulse-to-pulse separations of the order of 1–10 nanoseconds. The length of the pulse train produced by such a laser is determined by the lasing time of the laser oscillator, which will typically vary from about a microsecond to many seconds.

Because lasing conditions may vary with time, the energy, width, and spatial distributions of the picosecond pulses produced by such lasers may evolve in time. To effectively use these short pulses for the applications referenced above, it is necessary to identify the extent of these variations over the duration of the pulse train produced by the laser.

The characterization of ultra-short (picosecond and femtosecond) laser pulses presents a number of problems. Since conventional detectors cannot be used due to their limited bandwidth, various techniques, most of them based on the measurement of the second or higher order intensity autocorrelation functions, have been proposed and tested. These techniques can be used to reconstruct, through numerical convolution, the temporal profile of the pulses. However, they typically yield only the average of the pulse shape over the wavetrain, and do not provide any information on the possible transient evolution of either the pulse shape or mode size.

SUMMARY OF THE INVENTION

The present invention provides a technique for the simultaneous measurement, in real time, of the changes in mode size, pulse width, and power of the picosecond laser pulses delivered by mode-locked laser systems during the duration of the train of pulses generated by these lasers.

In brief, the invention contemplates directing respective portions of the laser beam along each of three beam paths. The beam portions along the first and second beam paths are subjected to respective, and different, degrees of focusing, and then passed through respective non-linear elements which generate radiation at the second harmonic. The first harmonic components are removed, and the second harmonic components are passed to respective first and second detectors which generate signals representative of the total second harmonic energy per pulse along each of the first and second beam paths. The beam portion along the third beam path is passed to a detector which generates a signal representative of the total energy in each beam pulse.

The three signals are combined to give values proportional to peak power, pulse width, and mode size. In order that the signals be proportional to the energy per pulse, the detectors must have a response time longer than the pulse width (say by a factor of 5–50). The detector response here must also be shorter than the time over which variations in pulse width, etc., are to be detected (which may be longer than the separation between adjacent pulses). Since this condition is easily met in all practical cases, the invention can be applied to most mode-locked laser systems.

A further understanding of the nature and advantages of the present invention may be realized by reference to the remaining portions of the specification and the attached drawings.

BRIEF DESCRIPTION OF THE DRAWINGS

FIG. 1 is a schematic view of the apparatus for carrying out the present invention;

FIG. 2 is a plot of the second harmonic conversion efficiency as a function of focusing parameter; and FIGS. 3A–C illustrate experimental results.

DESCRIPTION OF THE PREFERRED EMBODIMENT

Overview of the Apparatus

FIG. 1 is a schematic view of apparatus 10 for characterizing the time variation of the operating parameters of a mode-locked laser 12. The apparatus does not provide absolute values, but rather relative values of the laser beam parameters on a real time basis. Laser 12 can be almost any type of laser. The examples discussed below include a free-electron laser, whose parameters are characterized by deterministic equations of motion, and a mode-locked Nd:YAG laser, whose parameters are generally stable over time but characterized by random fluctuations induced by noise.

The laser beam is first passed through a filter 15 which removes any harmonics, and is divided by a pair of beam splitters 17 and 18 into three beam portions, which are directed along respective beam paths 20a, 20b, and 20c. The division typically contemplates a small fraction (a few percent) of the incident beam energy being directed along beam path 20 and roughly equal portions along beam paths 20a and 20b.

The first beam portion (directed along beam path 20a) passes through a lens 25a or similar focusing element and a non-linear element 27a. The non-linear element converts some of the incident energy at the fundamental frequency so as to generate a second harmonic component. The emerging radiation is passed through a filter 30a, which removes the radiation at the fundamental frequency, and the remaining second harmonic component is passed through a detector 32a. Detector 32a provides a signal, designated $A_L$, which is proportional to the total energy of the second harmonic pulses generated in non-linear element 27a.

The second beam portion is passed through a focusing element 25b, a non-linear element 27b, a filter 30b, and a detector 32b. These elements in beam path 20b correspond to those in beam path 20a except that the focal length of 25b is much shorter than that of focusing element 25a. The signal from detector 32b, which is proportional to the energy of the second harmonic pulses generated by non-linear crystal 27b is designated $A_S$.

The third beam portion is directed along beam path 20c to a detector 35 which provides a signal $A_O$ which is proportional to the energy of the individual pulses in the third beam path and therefore the energy of the individual pulses in the incident beam.

These three signals, $A_L$, $A_S$, and $A_O$, are communicated to a data acquisition system 40 which stores the three values on a repeated basis. As will described below, numerical values of the signals $A_L$, $A_S$ and $A_O$ recorded by the data acquisition systems can be manipulated to provide near-instantaneous relative values of the width, mode, size, and peak power of the individual pulses in the beam.

The data acquisition system must, at the minimum, record the output of each of the three detectors in time with a resolution adequate to reconstruct the output of the three detectors. In the simplest case, a 3-channel oscilloscope can be used to serve this function. A more elaborate data acquisition system could include a 3-channel digitizer with local fast memory. By way of example, in order to aquire 10 data points in a 1-microsecond pulse, the signals should be digitized every 100 nanoseconds with enough precision (say 16 bits) to allow subsequent arithmetic operations. This would require about 60 words of local memory (three channels and five data points before and after the 1-microsecond pulse). The time between pulses typically several milliseconds) is long enough to allow the data to be transferred to a dedicated microcomputer and the relative values of mode size pulse width, and peak power to be calculated.

Operation of the Apparatus

The operation of the invention requires a recognition and exploitation of the manner in which second harmonic generation occurs in non-linear crystals. In a non-linear crystal of length L, assumed to be perfectly phase matched, the peak powers $P_2$ and $P_1$, of the second and first harmonic beams, respectively, are related by:

$$P_2/P_1^2 = qf(Z_R/L) \qquad (1)$$

where q is a constant of proportionality, depending only on the properties of the crystal, $Z_R = \pi w_0^2/\lambda$ is the Rayleigh length of the first-harmonic beam inside the crystal, $w_0$ is the waist, and $\lambda$ is the wavelength of the beam.

The function $f(Z_R/L)$ takes into account the influence of the focusing parameter $Z_R/L$ on the conversion efficiency and can be written as:

$$f(Z_R/L) = (4L/Z_R) \arctan^2(Z_R/2L) \qquad (2)$$

This function is plotted in FIG. 2. Equation 2 assumes the following forms for the large and small argument limits:

$$f(Z_R/L) = \pi^2 L/Z_R \text{ for } Z_R/L \gg 1 \qquad (3A)$$

and $$f(Z_R/L) = Z_R/L \text{ for } Z_R/L \ll 1 \qquad (3B)$$

The validity of these equations rests on the hypothesis of an undepleted pump, which means roughly that in both of the non-linear crystals described above, the conversion efficiency to the second harmonic conversion must be limited to a few percent at most.

Detectors 32a-b and 35 are required to provide signals proportional to the total energy in the pulses that pass through them, and therefore must have a response time that is longer than the pulse width. Typically, the response time must be 5–50 times longer than the width of the individual pulses in the wavetrain. If pulse-to-pulse information is required, the detector responsivity time must be less than the pulse separation. However, pulse-to-pulse resolution is not normally required, and therefore this latter constraint on the detector can be relaxed. In such a case, the invention will provide measurements of the width, peak power, and mode size which are running averages of the single pulse data integrated over the number the pulses contained within the detector response time.

The extraction of the beam pulse parameters from the values of $A_L$, $A_S$, and $A_O$ proceeds as follows. It is convenient to define derived variables $B_L$ and $B_S$ as follows:

$$B_L = A_L/A_0^2 \qquad (4A)$$

$$B_S = A_S/A_0^2 \qquad (4B)$$

In the preferred realization of the invention, the long focal length lens 25a is sufficiently long so that $Z_R/L \gg 1$ while the short focal length lens 25b is sufficiently short so that $Z_R/L \ll 1$. For all cases, it is also justified to assume that for given wavelength and non-linear crystal, the width the second harmonic pulse is proportional to the width of the incident first harmonic pulse, independent of any other parameter.

If the pulse width $\tau$ is defined to be the ratio between the energy of the pulse and the peak power, the derived signals $B_L$ and $B_S$ are then proportional to the inverse product and ratio of $Z_R$ and $\tau$:

$$\begin{aligned} B_L &= A_L/A_0^2 \\ &\propto E_L/E_0^2 \text{ (proportional to energy)} \\ &\propto P_{2L}\,\tau/(P_{1L}\,\tau)^2 = (P_{2L}/P_{1L}^2)/\tau \\ &\propto 1/(Z_R\,\tau) \text{ (since } Z_R/L \gg 1) \end{aligned} \qquad (5A)$$

$$\begin{aligned} B_S &= A_S/A_0^2 \\ &\propto E_S/E_0^2 \\ &\propto P_{2S}\,\tau/(P_{1S}\,\tau)^2 = (P_{2S}/P_{1S}^2)/\tau \\ &\propto Z_R/\tau \text{ (since } Z_R/L \ll 1) \end{aligned} \qquad (5B)$$

Solving for $Z_R$ and $\tau$ in terms of $B_L$ and $B_S$, it is then evident that:

$$Z_R \propto (B_S/B_L)^{\frac{1}{2}} \qquad (6A)$$

$$\tau \propto 1/(B_S B_L)^{\frac{1}{2}} \qquad (6B)$$

The signal $A_0$, which is proportional to the total energy per pulse, can be divided by the relative value of $\tau$ in Equation 6B above to yield a quantity proportional to the peak power of the pulse.

Test Results

The following discussion is directed to the specific configuration of the apparatus and the results obtained in connection with measurements made on the MARK III Free Electron Laser. The output radiation of the MARK III Free Electron Laser consists of a train of pulses of the order of a microsecond long in which the individual pulses are of the order of a picosecond in width and are spaced by approximately 0.35 nanoseconds. The operating wavelength was 3.2 microns. The Rayleigh length of the fundamental mode was about 0.5 meters, and the mode measurement apparatus was located about 8 meters from the beam waist. After being focused by lenses 25a (f=1 meter) and lens 25b (f=0.2 meter), the first and second beam portions had Rayleigh lengths of 1.5 centimeters in crystal 27a and 0.6 millimeters in crystal 27b. The detectors were FND100 photodiodes manufactured by Phillips. The non-linear crystals were lithium niobate, each with a length of 5 millimeters. A preferred range would be about 2–20 millimeters.

FIGS. 3A–C show the experimental results obtained using this setup. FIG. 3A shows the evolutionary behavior of the Rayleigh length $Z_R$, normalized to a value of 1 at t=0, during the evolution of the macropulse. FIG. 3B shows the evolution of the pulse width, also normalized to 1 at t=0. FIG. 3C shows the evolution of the peak power, normalized to have a maximum value of 1.

Experiments have also been done to study the random fluctuations of the pulses produced by a mode-locked Nd:YAG laser operating at 1.06 microns with 30 picosecond pulses. Potassium dihydrogen phosphate (KDP) crystals were used as the non-linear elements. It was found that the Rayleigh length $Z_R$ exhibited fluctuations corresponding to a full width at half maximum of 15% and the pulse width $\tau$ exhibited variations corresponding to a full width at half maximum of about 35%.

Conclusion

In summary, it can be seen that the present invention provides a simple and effective method for characterizing the time dependent behavior of pulsed lasers. While the above is a description of the preferred embodiment of the invention, a number of the possible modifications, alternative constructions and equivalents may be employed without departing from the concept of the invention. For example, non-linear crystal tuned for third harmonic generation could be employed to derive equivalent results for the width, mode size, and intensity of the laser pulses. Therefore, the above description and illustrations should not be taken as limiting the scope of the invention which is defined by the appended claims.

We claim:

1. A method for measuring a beam parameter of a laser beam characterized by at least one laser pulse comprising the steps of:
    directing first, second, and third portions of the laser beam along separate first, second, and third beam paths;
    focusing the first and second beam portions, each to a different degree;
    passing the first and second beam portions through respective non-linear elements to generate radiation at a harmonic of the fundamental frequency in each of the first and second non-linear elements;
    generating respective first and second signals representative of the energy of the harmonic radiation generated in the first and second non-linear elements;
    generating a third signal representative of the total energy of the third beam portion; and
    combining the first, second, and third signals to provide at least one value representative of a beam parameter.

2. The method of claim 1 wherein the harmonic is the second harmonic.

3. The method of claim 1 wherein said step of combining the first, second, and third signals provides values proportional to at least one of peak power, pulse length, and mode size.

4. The method of claim 1 wherein said focusing step includes bringing the first and second beam portions to respective foci within the non-linear elements 5. Apparatus for measuring a beam parameter of a laser beam characterized by at least one laser pulse comprising:
    means for dividing the laser beam into first, second and third portions directed along respective first, second, and third beam paths;
    first and second focusing means for subjecting said first and second beam portions to differing degrees of focusing;
    first and second non-linear elements in said first and second beam paths for generating radiation at a harmonic of the fundamental frequency;
    means for generating first and second signals representative of the harmonic energy generated in each of said first and second non-linear elements;
    means for generating a third signal representative of the total energy to said third beam portion; and
    means for combining said first, second, and third signals to extract values proportional to at least one of peak power, pulse width, and mode size.

6. The apparatus of claim 5 wherein said first and second non-linear elements are configured for generation at the second harmonic.

7. Apparatus for measuring a beam parameter of a laser beam characterized by at least one laser pulse comprising:
    means for dividing the laser beam into first, second, and third beam portions directed along respective first, second, and third beam paths;
    first and second focusing means disposed in said first and second beam paths, said first focusing means having a focal length that is greater than that of said second focusing means;
    first and second non-linear elements disposed downstream of said first and second focusing means in said first and second beam paths for generating first and second beam components at a harmonic of the fundamental frequency;
    first and second filters disposed downstream of said first and second beam paths for removing radiation at all but the harmonic frequency from said first and second beam portions;
    first and second detectors disposed downstream of said first and second filter means for generating first and second signals representative of the second harmonic energy of each of said first and second beam components;
    a third detector in said third beam path for generating a third signal representative of the total energy of said third beam portion; and
    means for combining said first, second, and third signals to extract proportional beam parameters.

8. The apparatus of claim 7 wherein said first and second non-linear elements are configured for generation at the second harmonic.

9. The apparatus of claim 7 wherein said first and second focusing means differ by approximately a factor of 5 in power.

10. The apparatus of claim 7 wherein each of said non-linear elements is a lithium niobate crystal.

11. The apparatus of claim 7 wherein each of said non-linear elements is a potassium dihydrogen phosphate crystal.

12. The apparatus of claim 7 wherein each of said first, second, and third detectors comprises a photodiode.

13. The apparatus of claim 5 wherein each of said first and second non-linear elements has a length along the beam direction in the range of 2-20 millimeters.

14. A method for providing signals that can be used to measure a beam parameter of a laser beam characterized by at least one laser pulse comprising the steps of:
   directing first, second, and third portions of the laser beam along separate first, second, and third beam paths;
   focusing the first and second beam portions, each to a different degree;
   passing the first and second beam portions through respective non-linear elements to generate radiation at a harmonic of the fundamental frequency in each of the first and second non-linear elements;
   generating respective first and second signals representative of the energy of the harmonic radiation generated in the first and second non-linear elements; and
   generating a third signal representative of the total energy of the third beam portion.

15. The method of claim 14 wherein the harmonic is the second harmonic.

16. The method of claim 14, and further comprising the step of combining the first, second, and third signals to provide values proportional to at least one of peak power, pulse length, and mode size.

17. The method of claim 14, wherein said focusing step includes bringing the first and second beam portions to respective foci within the non-linear elements.

18. Apparatus for providing signals that can be used to measure a beam parameter of a laser beam characterized by at least one laser pulse comprising:
   means for dividing the laser beam into first, second and third portions directed along respective first, second, and third beam paths;
   first and second focusing means for subjecting said first and second beam portions to differing degrees of focusing;
   first and second non-linear elements in said first and second beam paths for generating radiation at a harmonic of the fundamental frequency;
   means for generating first and second signals representative of the harmonic energy generated in each of said first and second beam non-linear elements; and
   means for generating a third signal representative of the total energy of said third beam portion.

19. The apparatus of claim 18 wherein said first and second non-linear elements are configured for generation at the second harmonic.

20. Apparatus for providing signals that can be used to measure a beam parameter of a laser beam characterized by at least one laser pulse comprising:
   means for dividing the laser beam into first, second, and third beam portions directed along respective first, second, and third beam paths;
   first and second focusing means disposed in said first and second beam paths, said first focusing means having a focal length greater than that of said second focusing means;
   first and second non-linear elements disposed downstream of said first and second focusing means in said first and second beam paths for generating first and second beam components at a harmonic of the fundamental frequency;
   first and second filters disposed downstream of said first and second non-linear elements in said first and second beam paths for removing radiation at all but the harmonic frequency from said first and second beam portions;
   first and second detectors disposed downstream of said first and second filter means for generating first and second signals representative of the second harmonic energy of each of said first and second beam components; and
   a third detector in said third beam path for generating a third signal representative of the total energy of said third beam portion.

21. A method for providing beam portions derived from a laser beam characterized by at least one laser pulse to permit the generation of signals that may be used to measure a beam parameter of the laser beam, comprising the steps of:
   directing first, second, and third portions of the laser beam along separate first, second, and third beam paths;
   focusing the first and second beam portions, each to a different degree; and
   passing the first and second beam portions through respective non-linear elements to generate radiation at a harmonic of the fundamental frequency in each of the first and second non-linear elements.

22. The method of claim 21 wherein the harmonic is the second harmonic.

23. The method of claim 21 wherein said focusing step includes bringing the first and second beam portions to respective foci within the non-linear elements.

24. Apparatus for providing beam portions derived from a laser beam characterized by at least one laser pulse to permit the generation of signals that may be used to measure a beam parameter of the laser beam, comprising:
   means for dividing the laser beam into first, second, and third portions directed along respective first, second, and third beam paths;
   first and second focusing means for subjecting said first and second beam portions to differing degrees of focusing; and
   first and second non-linear elements in said first and second beam paths for generating radiation at a harmonic of the fundamental frequency.

25. The apparatus of claim 24 wherein said first and second non-linear elements are configured for generation at the second harmonic.

26. Apparatus for providing beam portions derived from a laser beam characterized by at least one laser pulse to permit the generation of signals that may be used to measure a beam parameter of the laser beam, comprising:

means for dividing the laser beam into first, second, and third beam portions directed along respective first, second, and third beam paths;

first and second focusing means disposed in said first and second beam paths, said first focusing means having a focal length that is longer than that of said second focusing means;

first and second non-linear elements disposed downstream of said first and second focusing means in said first and second beam paths for generating first and second beam components at a harmonic of the fundamental frequency; and first and second filters disposed downstream of said first and second non-linear elements in said first and second beam paths for removing radiation at all but the harmonic frequency from said first and second beam portions.

27. The method of claim 1 wherein the laser is a free electron laser.

28. The method of claim 1 wherein the laser is a mode-locked Nd:YAG laser.

29. The method of claim 14 wherein the laser is a free electron laser.

30. The method of claim 14 wherein the laser is a mode-locked Nd:YAG laser.

31. The method of claim 21 wherein the laser is a free electron laser.

32. The method of claim 21 wherein the laser is a mode-locked Nd:YAG laser.

33. The method of claim 1 wherein the at least one laser pulse has a length on the order of a picosecond.

34. The method of claim 14 wherein the at least one laser pulse has a length on the order of a picosecond.

35. The method of claim 21 wherein the at least one laser pulse has a length on the order of a picosecond.

36. The method of claim 1 wherein the laser beam is characterized by a train of pulses.

37. The method of claim 14 wherein the laser beam is characterized by a train of pulses.

38. The method of claim 21 wherein the laser beam is characterized by a train of pulses.

* * * * *